United States Patent
Freeman et al.

(10) Patent No.: US 10,934,859 B2
(45) Date of Patent: Mar. 2, 2021

(54) TURBINE BLADE COMPRISING CERAMIC MATRIX COMPOSITE MATERIALS

(71) Applicants: Rolls-Royce North American Technologies Inc., Indianapolis, IN (US); Rolls-Royce plc, London (GB)

(72) Inventors: Ted J. Freeman, Danville, IN (US); Anthony Razzell, Derbyshire (GB); Michael J. Whittle, Derby (GB)

(73) Assignees: Rolls-Royce North American Technologies Inc., Indianapolis, IN (US); Rolls-Royce plc

( * ) Notice: Subject to any disclaimer, the term of this patent is extended or adjusted under 35 U.S.C. 154(b) by 218 days.

(21) Appl. No.: 16/111,749

(22) Filed: Aug. 24, 2018

(65) Prior Publication Data

US 2020/0063575 A1    Feb. 27, 2020

(51) Int. Cl.
*F01D 5/28*    (2006.01)
*F01D 5/30*    (2006.01)

(52) U.S. Cl.
CPC ........... *F01D 5/282* (2013.01); *F01D 5/3007* (2013.01); *F01D 5/3061* (2013.01); *F01D 5/3084* (2013.01); *F05D 2230/237* (2013.01); *F05D 2240/80* (2013.01); *F05D 2300/6033* (2013.01)

(58) Field of Classification Search
CPC .............................. F01D 5/3023; F01D 5/3046
See application file for complete search history.

(56) References Cited

U.S. PATENT DOCUMENTS

| | | | |
|---|---|---|---|
| 922,581 A * | 5/1909 | Hanzlik | F01D 5/3038 |
| | | | 416/218 |
| 1,318,091 A | 10/1919 | Ljungstrom | |
| 2,948,505 A * | 8/1960 | Sonder | F01D 5/22 |
| | | | 416/96 R |
| 4,509,900 A | 4/1985 | Odawara | |
| 4,573,875 A | 3/1986 | Emeterio et al. | |
| 5,263,823 A * | 11/1993 | Cabaret | F01D 11/006 |
| | | | 416/218 |
| 8,651,820 B2 | 2/2014 | Krikunov et al. | |
| 9,903,212 B2 | 2/2018 | James | |
| 9,909,430 B2 * | 3/2018 | Freeman | F01D 5/30 |
| 9,938,838 B2 | 4/2018 | Witz et al. | |
| 2011/0200440 A1 * | 8/2011 | Stiehler | F01D 5/32 |
| | | | 416/212 A |
| 2016/0047257 A1 | 2/2016 | Radomski et al. | |
| 2016/0138407 A1 * | 5/2016 | Freeman | F01D 5/284 |
| | | | 416/214 A |
| 2016/0201484 A1 * | 7/2016 | Engel | F01D 5/284 |
| | | | 416/220 R |

* cited by examiner

*Primary Examiner* — Justin D Seabe
*Assistant Examiner* — Jason G Davis
(74) *Attorney, Agent, or Firm* — Barnes & Thornburg LLP

(57) ABSTRACT

The present disclosure is related to turbine wheel assemblies for gas turbine engines. Such turbine wheel assemblies may include ceramic matrix composite airfoil components mounted with different types of coupling to a central disk.

15 Claims, 4 Drawing Sheets

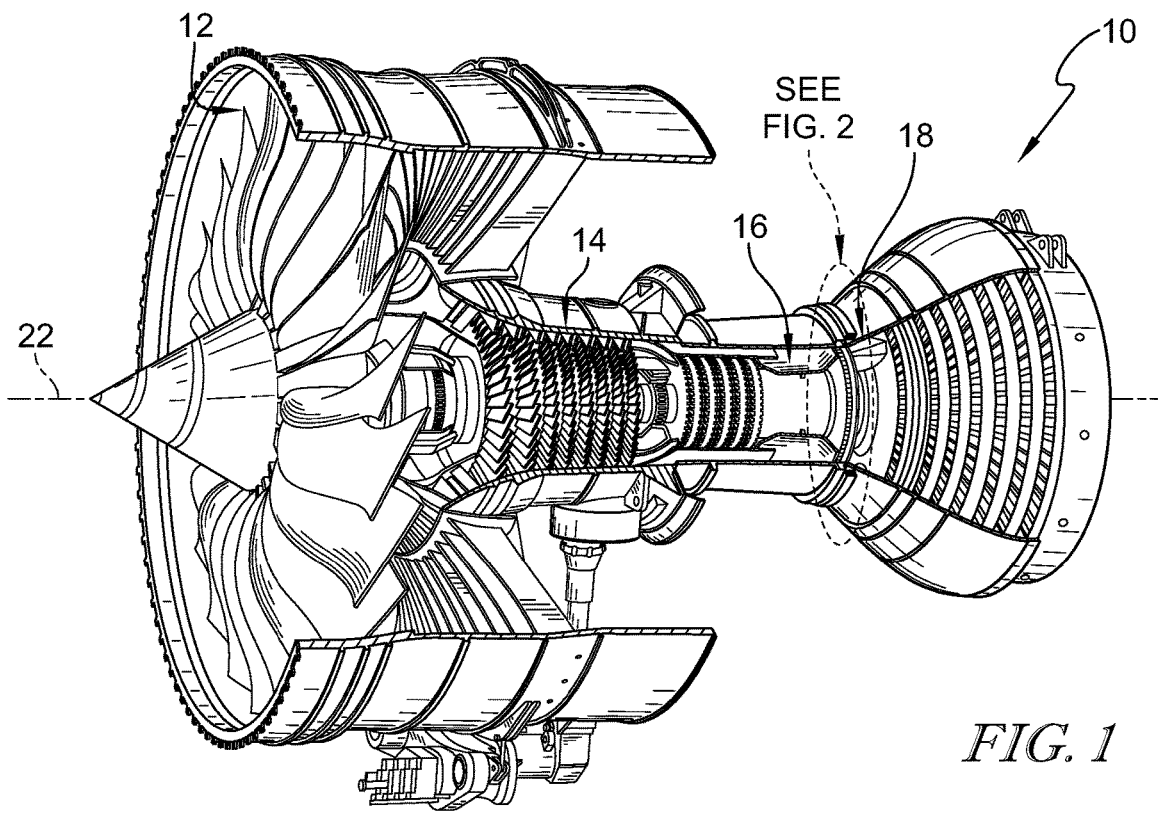
FIG. 1
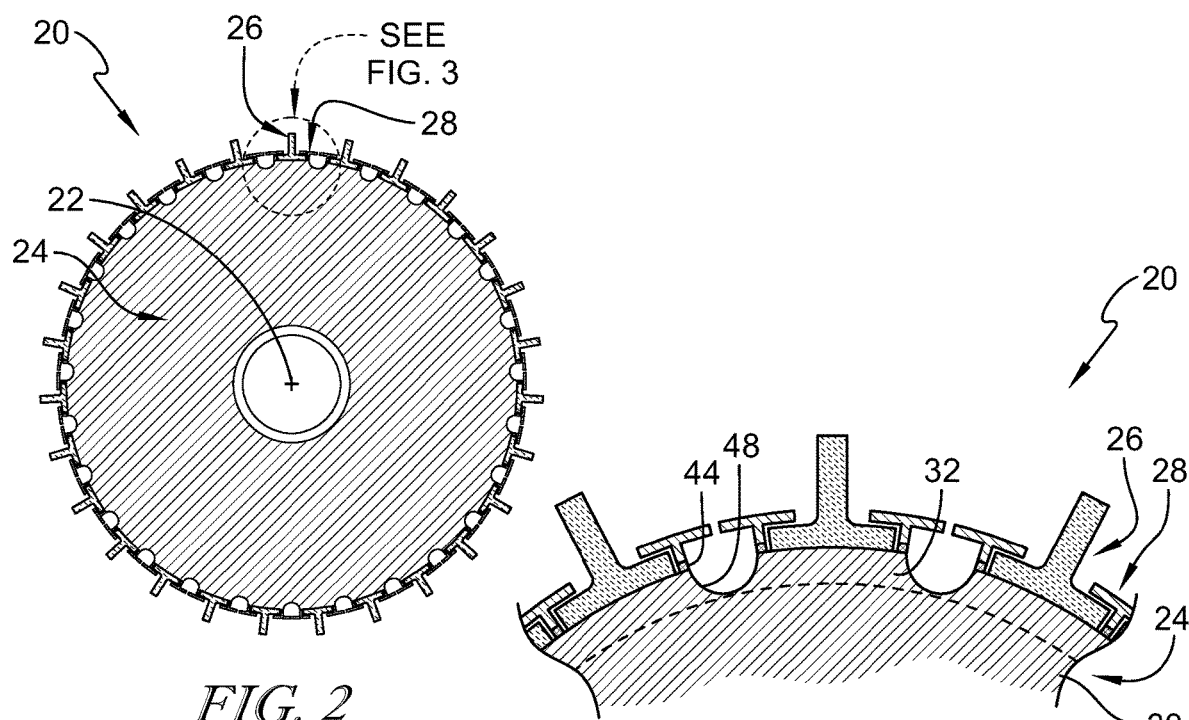
FIG. 2
FIG. 3

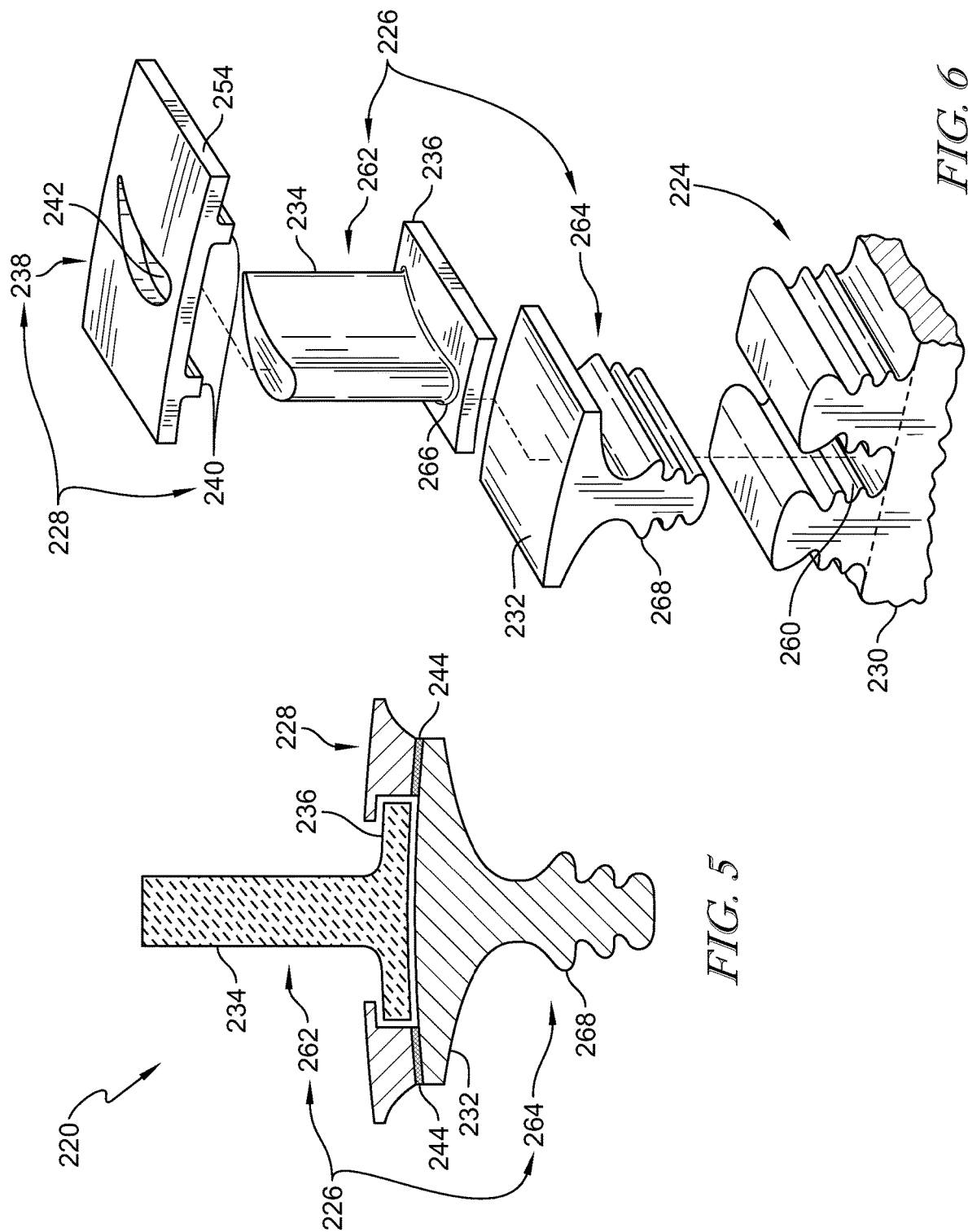

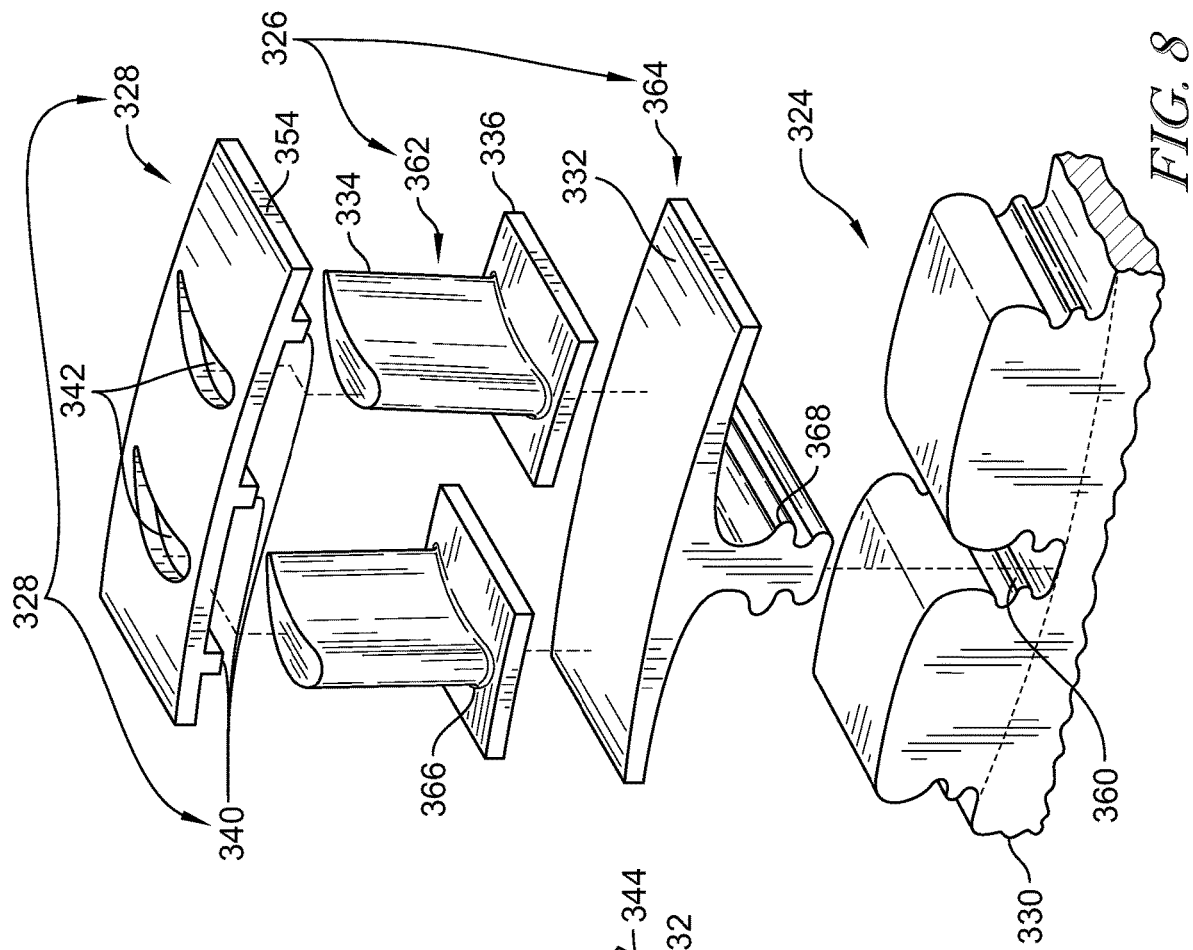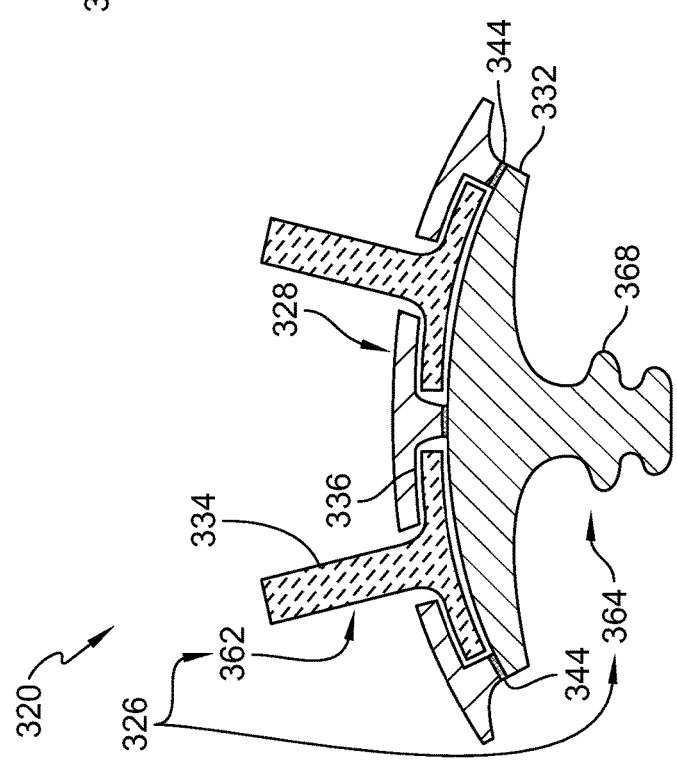

TURBINE BLADE COMPRISING CERAMIC MATRIX COMPOSITE MATERIALS

FIELD OF THE DISCLOSURE

The present disclosure relates generally to gas turbine engines, and more specifically, to turbine wheel assemblies used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. Some rotating wheel assemblies can include ceramic-containing components. Ceramic-containing components can be designed to withstand very high temperatures while also being lightweight. In view of the potential benefits of including ceramic-containing materials in rotating wheel assemblies, there is a need for further design development in this area.

SUMMARY

The present disclosure may comprise one or more of the following features and combinations thereof.

A turbine blade assembly for use in a gas turbine engine may include a disk, a turbine blade, and a keeper collar. The disk comprises metallic materials, while the turbine blade comprises ceramic matrix composite materials.

In some embodiments, the disk includes a hub and a plurality of mount pads. The mount pads are coupled to the disk and spaced around a circumference of the hub. Each mount pad extends radially outward from the hub away from the central axis. The keeper collar is coupled to one of the mount pads of the disk and is configured to block radially-outward movement of the turbine blade away from the disk so that the turbine blade is coupled to the disk.

In some embodiments, the turbine blade is shaped to include an airfoil and a coupler flange. The airfoil is shaped to withdraw work from hot gasses passing through the gas turbine engine. The coupler flange is arranged at a radially inner end of the airfoil and extends circumferentially in both directions around the central axis.

In some embodiments, the keeper collar includes a retention panel and stand-off legs. The retention panel is formed to include an airfoil-receiver aperture through which the airfoil extends. The stand-off legs extend radially-inwardly from the retention panel to the disk. The airfoil-receiving aperture is formed through the retention panel and is sized to allow the airfoil of the turbine blade to pass through in a radially-upward direction but to block the coupler flange of the turbine blade from radially-outward motion through the retention panel when the airfoil is pushed through.

In some embodiments, a bond layer is between the stand-off legs of the keeper collar and the disk and fixes the keeper collar in place relative to the disk. The bond layer is one of a base layer and a weld layer. In another embodiment, the bond layer is formed between the stand-off legs and a radially-outward facing surface of the mount pads.

These and other features of the present disclosure will become more apparent from the following description of the illustrative embodiments.

BRIEF DESCRIPTION OF THE DRAWINGS

FIG. 1 is a perspective view of a gas turbine engine with a portion of the engine cut away to show, from left to right, a turbofan, a compressor section, a combustor, and a turbine section included in the engine:

FIG. 2 is a cross-sectional elevation view of a turbine wheel assembly used in the turbine section of the engine of FIG. 1 showing that the turbine wheel assembly includes a disk and turbine blades spaced around the outer diameter of the disk;

FIG. 3 is a detail view of portion of FIG. 2 showing that the turbine wheel assembly includes a disk comprised of metallic materials, a turbine blade comprised of ceramic matrix composite materials, and a keeper collar configured to keep the blade attached to the disk.

FIG. 5 is a cross-sectional detail view of a portion of a second turbine wheel assembly showing that the turbine wheel assembly includes a disk comprised of metallic materials, a turbine blade comprised of ceramic materials, and a keeper collar;

FIG. 6 is an exploded perspective assembly view of a portion of the turbine wheel assembly of FIG. 5 showing that each turbine blade includes a gas path piece and a root piece;

FIG. 7 is a cross-sectional detail view of a portion of a third turbine wheel assembly showing that the turbine wheel assembly includes a disk comprised of metallic materials, turbine blades comprised of ceramic matrix composite materials, and a keeper collar; and FIG. 8 is an exploded perspective assembly view of a portion of the turbine wheel assembly of FIG. 7 showing that each turbine blade includes a gas path piece and a root piece.

DETAILED DESCRIPTION OF THE DRAWINGS

Figure 4:
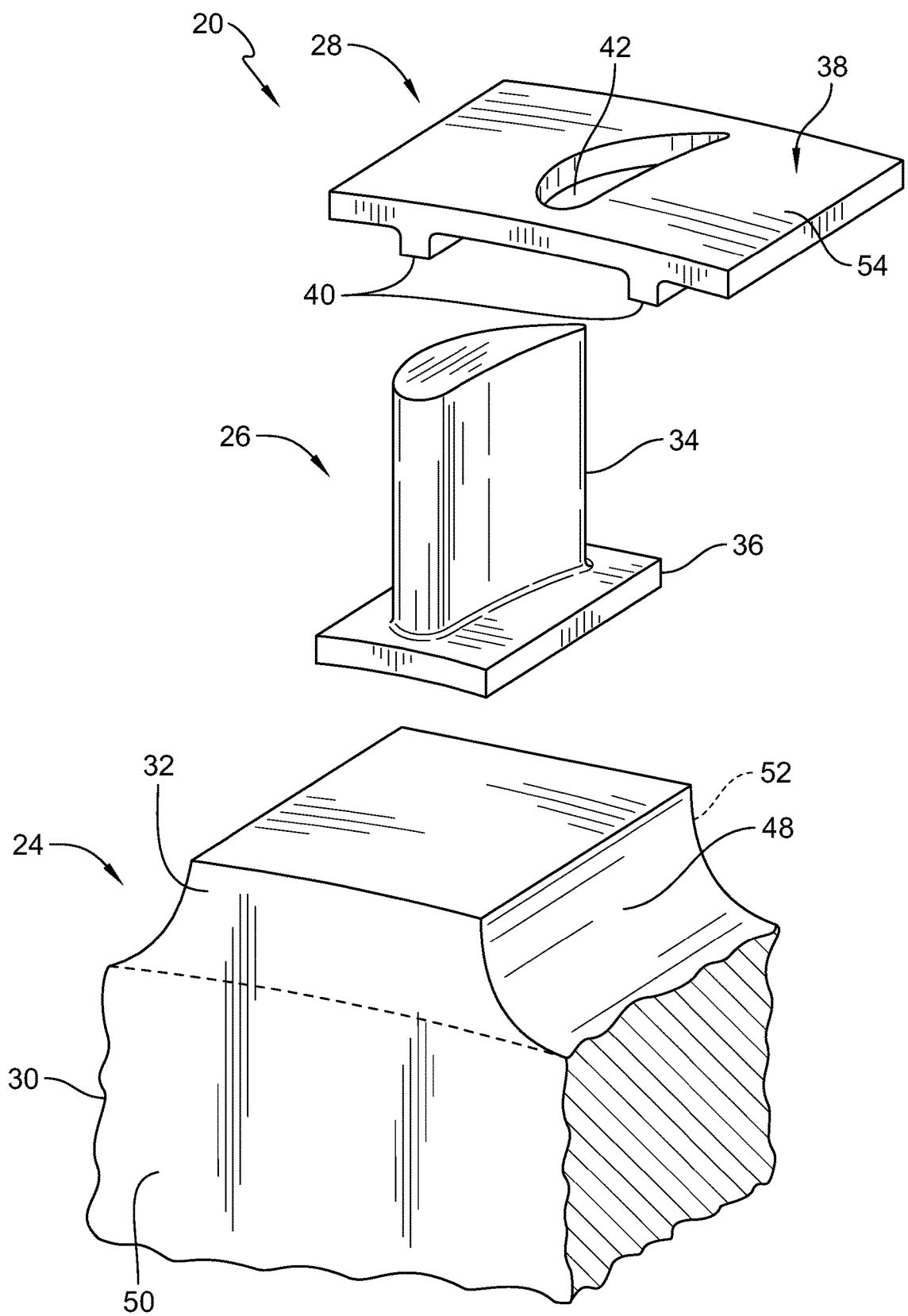
FIG. 4 is an exploded perspective assembly view of a portion of the turbine wheel of FIGS. 2 and 3 showing that each turbine blade includes an airfoil and a coupler flange arranged at a radially inner end of the airfoil and that the disk includes a hub and a plurality of mount pads.

For the purposes of promoting an understanding of the principles of the disclosure, reference will now be made to a number of illustrative embodiments illustrated in the drawings and specific language will be used to describe the same.

A gas turbine engine 10 according to the present disclosure is shown in FIG. 1. The engine 10 includes a turbofan 12, a compressor section 14, a combustor 16, and a turbine section 18. The fan 12 rotates to provide thrust to an associated aircraft. The compressor section 14 draws in air and compresses it increasing pressure of the air before delivering it to the combustor 16. In the combustor 16, fuel is mixed with the pressurized air from the compressor section and is ignited to create hot high-pressure combustion products. The combustion products move out of the combustor and into the turbine section 18 where they interact with the turbine section creating rotation of some turbine section 18 components that, in turn, drive rotation of the fan 12 as well as some components of the compressor section 14.

A first turbine wheel assembly 20 adapted for use in the turbine section 18 of the engine 10 is shown in FIGS. 2-4. The turbine wheel assembly 20 is designed to rotate about a central axis 22 upon interaction with expanding combustion products from the combustor 16. The turbine wheel assembly 20 includes a disk 24, a turbine blade 26, and a keeper collar 28 as shown in FIGS. 3 and 4. The disk 24 is made of metallic materials and is arranged around the central axis 22. The turbine blade 26 is made of ceramic matrix composite materials. The keeper collar 28 receives the turbine blade 26 extending therethrough and is bonded to the disk 24 to couple the turbine blade 26 to the disk 24.

The disk 24 includes a hub 30 and a plurality of mount pads 32 as shown in FIGS. 3 and 4. The mount pads 32 are coupled to the disk 24 and spaced around a circumference of the hub 30. Each mount pad 32 extends radially outward from the hub away from the central axis 22.

The turbine blade 26 is shaped to include an airfoil 34 and a coupler flange 36 as shown in FIGS. 3 and 4. The airfoil 34 is shaped to withdraw work from hot gasses passing through the gas turbine engine 10. The coupler flange 36 is arranged at a radially inner end of the airfoil 34 and extends circumferentially in both directions around the central axis 22.

The keeper collar 28 is coupled to one of the mount pads 32 of the disk 24 and is configured to block radially-outward movement of the turbine blade 26 away from the disk 24 so that the turbine blade 26 is coupled to the disk 24 as shown in FIG. 4. The keeper collar 28 includes a retention panel 38 and stand-off legs 40 as shown in FIG. 4. The retention panel 38 is formed to include an airfoil-receiver aperture 42 through which the airfoil 34 of the turbine blade 26 extends. The stand-off legs 40 extend radially-inwardly from the retention panel 38 to the disk 24.

In the illustrative embodiments, a bond layer 44 is between the stand-off legs 40 of the keeper collar 28 and the disk 24. The bond layer 44 fixes the keeper collar 28 in place relative to the disk 24. In some embodiments, the bond layer 44 is one of a base layer and a weld layer. In some embodiments, the bond layer 44 is formed between the stand-off legs 40 and a radially-outward facing surface 46 of one of the mount pads 32.

In the illustrative embodiments, the airfoil-receiving aperture 42 is formed through the retention panel 38 as shown in FIG. 4. The airfoil-receiving aperture 42 is sized to allow the airfoil 34 of the turbine blade 26 to pass through in a radially-upward direction but to block the coupler flange 36 of the turbine blade 26 from radially-outward motion through the retention panel 38 when the airfoil 34 is pushed through.

In the illustrative embodiments, the disk 24 defines scallops 48 as shown in FIG. 3. The scallops 48 are defined circumferentially between the plurality of mount pads 32. In some embodiments, the scallops 48 extend axially through the disk 24 from a forward side 50 to an aft side 52 of the disk 24.

In the illustrative embodiments, the retention panel 38 of the keeper collar 36 extends circumferentially over portions of scallops 48 circumferentially adjacent to the keeper collar 36 to provide a platform 54 as shown in FIG. 3. The platform 54 resists radially inward movement of hot gasses around the airfoil 34 from intersection with the disk 24 when the turbine wheel assembly 20 is used in the gas turbine engine 10.

In the illustrative embodiments, the stand-off legs 40 of the keeper collar 36 extend from the retention panel 38 to a radially-outward surface of the mount pad 32 by the bond layer 44. In some embodiments, the at least one stand-off leg 44 of each keeper collar 28 is coupled to the radially-outer most surface 56 of the disk 24 by a bond. The bond is one of a base layer and a weld.

In the illustrative embodiment, the turbine wheel assembly 20 includes the disk 24, a plurality of turbine blades 26, and a plurality of keeper collars 28 as shown in FIG. 3. The disk 24 is made from metallic materials. The disk 24 is arranged around a central axis 22 and has a radially-outward surface 56. The plurality of turbine blades 26 are made at least in part from ceramic matrix composite materials. The plurality of keeper collars 28 are configured to couple the plurality of turbine blades 26 to the disk 24 for rotation with the disk 24 about the central axis 22.

A second turbine wheel assembly 220 adapted for use in the turbine section 18 of the engine 10 is shown in FIGS. 5 and 6. The turbine wheel assembly includes a disk 224, a turbine blade 226, and a keeper collar 228. The disk 224 is made from metallic materials and arranged around a central axis 22. The turbine blade 226 is made at least in part from ceramic matrix composite materials.

The disk 224 is formed to include a hub 230 and slots 260 as shown in FIG. 6. The slots 260 are formed around a periphery of the disk 224.

The turbine blade 226 includes a gas path piece 262 and a root piece 264 as shown in FIGS. 5 and 6. The gas path piece 262 is made from ceramic matrix composite materials. The root piece 264 is made from metallic materials.

The gas path piece 262 is shaped to include an airfoil 234 and a coupler flange 236 as shown in FIGS. 5 and 6. The coupler flange 236 extends circumferentially in both directions from a radically inner end 266 of the airfoil 234.

The root piece 264 is shaped to include a mount pad 232 and an attachment feature 268 as shown in FIGS. 5 and 6. The attachment feature 268 is received in one of the plurality of slots 260 formed in the disk 224 to couple the root piece 264 to the disk 224.

The keeper collar 228 is configured to couple the gas path piece 262 of the turbine blade 226 to the mount pad 232 included in the root piece 264 of the turbine blade 226 as shown in FIGS. 5 and 6. The keeper collar 228 is configured to couple the gas path piece 262 to the mount pad 232 so that the airfoil 234 of the gas path piece 262 is coupled to the disk 224 for rotation with the disk 224 about the central axis 22.

The keeper collar 228 includes a retention panel 238 and at least one stand-off leg 240 as shown in FIGS. 5 and 6. The retention panel 238 is formed with an airfoil-receiver aperture 242 through which the airfoil 234 extends. The airfoil-receiver aperture 242 is sized to block movement of the coupler flange 236 through the retention panel 238. The at least one stand-off leg 240 extends from the retention panel 238 to the mount pad 232 to couple the keeper collar 228 to the root piece 264 of the turbine blade 226. In some embodiments, the keeper collar 228 is coupled to the mount pad 232 by a braze layer 244. In some embodiments, the keeper collar 228 is coupled to the mount pad 232 by a weld. In some embodiments, the keeper collar 228 extends only partway around the central axis 22.

In the illustrative embodiments, the attachment feature 268 of the root piece has a fir tree shape as shown in FIGS. 5 and 6. In some embodiments, the attachment feature 268 may have one a dovetail shape.

A third turbine wheel assembly 320 adapted for use in the turbine section 18 of the engine 10 is shown in FIGS. 7 and 8. The turbine wheel assembly includes a disk 324, a turbine blade 326, and a keeper collar 228. The disk 324 is made from metallic materials and arranged around a central axis 22. The turbine blade 326 is made at least in part from ceramic matrix composite materials.

The disk 324 is formed to include a hub 330 and slots 360 as shown in FIGS. 7 and 8. The slots 360 are formed around a periphery of the disk 324.

The turbine blade 326 includes a gas path piece 362 and a root piece 364 as shown in FIGS. 7 and 8. The gas path piece 362 is made from ceramic matrix composite materials. The root piece 364 is made from metallic materials.

The gas path piece 362 is shaped to include an airfoil 334 and a coupler flange 336 as shown in FIGS. 7 and 8. The coupler flange 336 extends circumferentially in both directions from a radically inner end 366 of the airfoil 334.

The root piece 364 is shaped to include a mount pad 332 and an attachment feature 368 as shown in FIGS. 7 and 8. The attachment feature 368 is received in one of the plurality of slots 360 formed in the disk 324 to couple the root piece 364 to the disk 324.

The keeper collar 328 is configured to couple the gas path piece 362 of the turbine blade 326 to the mount pad 332 included in the root piece 364 of the turbine blade 326 as shown in FIGS. 7 and 8. The keeper collar 328 is configured to couple the gas path piece 362 to the mount pad 332 so that the airfoil 334 of the gas path piece 362 is coupled to the disk 324 for rotation with the disk 324 about the central axis 22.

The keeper collar includes a retention panel 338 and at least one stand-off leg 340 as shown in FIGS. 7 and 8. The retention panel 338 is formed with an airfoil-receiver aperture 342 through which the airfoil 334 extends. The airfoil-receiver aperture 342 is sized to block movement of the coupler flange 336 through the retention panel 338. The at least one stand-off leg 340 extends from the retention panel 338 to the mount pad 332 to couple the keeper collar 328 to the root piece 364 of the turbine blade 326. In some embodiments, the keeper collar 328 is coupled to the mount pad 332 by one of a braze layer and a weld. In some embodiments, the keeper collar 328 extends only partway around the central axis 22.

In the illustrative embodiments, the attachment feature 368 of the root piece has a fir tree shape as shown in FIGS. 7 and 8. In some embodiments, the attachment feature 368 may have one a dovetail shape.

The present disclosure introduces ceramic matrix composite materials into the turbine section of a gas turbine engine. A ceramic matrix composite material allows the reduction of cooling air usage, an increase in turbine entry temperatures, weight savings, and an overall increase in turbine efficiency.

According to the present disclosure, a ceramic matrix composite turbine airfoil includes a flange at the base of the airfoil. The flange acts as a retention or attachment feature for the airfoil. The flanged blade is attached to the disk by blisk bonding. A metallic disk includes a plurality of features configured to accept the flanged airfoil and a keeper collar. The keeper collar is shaped as a single metallic element which slides over the airfoil and is bonded to the disk. The keeper collar is configured to retain and located the flanged blade on the disk. Either the keeper collar or the feature on the disk include a cavity. The cavity is shaped to receive the flange on the airfoil. The keeper collar may be bonded to the disk by diffusion bonding, diffusion brazing, standard brazing, or a mechanical attachment. In the illustrative embodiments, the keeper collar acts as a platform and includes the features required such as dampers and seals.

The assembly may be made reparable by shaping the features on the disk so that the features are tall enough to machine off the blade and the keeper collar at overhaul. Once machined off, longer keeper collars and flanges may be used to account for the reduced height of the features on the disk that were machined away.

In some embodiments, the disk further includes a metallic attachment configured to receive the flanged airfoil. The keeper collar is configured to slide over the airfoil and be bonded to the metallic attachment. Either the keeper collar or the metallic attachment on the disk include a recess. The recess is shaped to located and retain the flanged airfoil. In the illustrative embodiments, the keeper collar acts as a platform.

In some embodiments, the assembly includes two flanged airfoils. The disk includes a metallic attachment configured to receive the two flanged airfoils. The keeper collar is configured to slide over the two flanged airfoils and be bonded to the metallic attachment. Either the keeper collar or the metallic attachment on the disk include a recess. The recess is shaped to located and retain the flanged airfoil. In the illustrative embodiments, the keeper collar acts as a platform. This embodiment may be implemented in a compressor fan. The compressor fan pull of the airfoils is low relative to metallic airfoils.

According to the present disclosure, the airfoils may be solid or hollow. If the airfoils are hollow, then the airfoil includes a tip cap. Additionally, the keeper collar comprises a metallic alloy. The metallic alloy may be either CMSX-3, CMSX-4, Mar-M247, or another equally capable singe crystal or equiax alloy. The metallic attachment comprises either a single crystal alloy or an equiax alloy such as Mar-M247.

Further, any interfaces between the metallic materials and the ceramic matrix composite materials may include a diffusion or wear coating. The diffusion or wear coating minimizes material transfer and wear between the ceramic matrix composite materials and the metallic materials.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine wheel assembly adopted for use in a gas turbine engine, the assembly comprising
a disk made of metallic materials and arranged around a central axis, the disk shaped to include a hub and a plurality of mount pads spaced around a circumference of the hub that each extend radially outward from the hub away from the central axis,
a turbine blade made at least in part from ceramic matrix composite materials,
the turbine blade formed to include an airfoil shaped to withdraw work from hot gasses passing through the gas turbine engine and a coupler flange arranged at a radially inner end of the airfoil that extends circumferentially in both directions around the central axis, and
a keeper collar coupled to one of the mount pads of the disk and configured to block radially-outward movement of the turbine blade away from the disk so that the turbine blade is coupled to the disk, the keeper collar including a retention panel formed to include an airfoil-receiver aperture through which the airfoil of the turbine blade extends and stand-off legs that extend radially-inwardly from the retention panel to the disk.

2. The assembly of claim 1, wherein a bond layer that between the stand-off legs of the keeper collar and the disk to fix the keeper collar in place relative to the disk.

3. The assembly of claim 2, wherein the bond layer is one of a base layer and a weld layer.

4. The assembly of claim 2, wherein the bond layer is formed between the stand-off legs and a radially-outward facing surface at one of the mount pads.

5. The assembly of claim 1, wherein the airfoil-receiving aperture formed through the retention panel is sized to allow the airfoil of the turbine blade to pass through in a radially-upward direction but to block the coupler flange of the turbine blade from radially-outward motion through the retention panel when the airfoil is pushed through.

6. The assembly of claim 5, wherein the disk defines scallops circumferentially between the plurality of mount pads.

7. The assembly of claim 6, wherein the scallops extend axially through the disk from a forward side to an aft side of the disk.

8. The assembly of claim 6, wherein the retention panel of the keeper collar extends circumferentially over portions of scallops circumferentially adjacent to the keeper collar to provide a platform that resists radially inward movement of hot gasses around the airfoil from intersection with the disk when the turbine wheel assembly is used in the gas turbine engine.

9. The assembly of claim 5, wherein the wherein the stand-off legs of the keeper collar extend from the retention panel to a radially-outward surface of the mount pad by a bond layer.

10. A turbine wheel assembly, the assembly comprising
a disk made from metallic materials, the disk arranged around a central axis and having a radially-outermost surface,
a plurality of turbine blades made at least in part from ceramic matrix composite materials, each turbine blade shaped to form an airfoil and a coupler flange that extends circumferentially in both directions around the central axis from a radially-inner end of the airfoil, and
a plurality of keeper collars configured to couple the plurality of turbine blades to the disk for rotation with the disk about the central axis, each of the keeper collars including a retention panel shaped to extend partway about the central axis and formed to define an airfoil-receiver aperture, the airfoil-receiving aperture sized to allow the airfoil of a corresponding one of the turbine blades to move radially outwardly therethrough but also to block the coupler flange of the corresponding one of the turbine blades from radially outwardly movement through the retention panel,
wherein each of the plurality of keeper collars has one airfoil included in the plurality of turbine blades arranged through the airfoil-receiver aperture formed in its retention panel and each of the plurality of keeper collars includes at least one stand-off leg of that extends from the retention panel toward the disk and the at least one stand-off leg of each keeper collar is coupled to the radially-outermost surface of the disk by a bond layer.

11. The assembly of claim 10, wherein the bond layer is one of a base layer and a weld.

12. The assembly of claim 10, wherein the disk includes a hub and a plurality of mount pads circumferentially spaced apart from each other that extend radically-outward from the hub to define scallops between adjacent mount pads.

13. The assembly of claim 12, wherein the plurality of mount pads define the radially-outermost surface of the disk and each of the plurality of keeper collars is coupled to one corresponding mount pad.

14. The assembly of claim 12, wherein the retention panel of each of the plurality of keeper collars extends circumferentially around adjacent scallops defined by the plurality of mount pads to provide a platform that resists radially inward movement of hot gasses around the airfoil from intersection with the disk when the turbine wheel assembly is used in a gas turbine engine.

15. A turbine wheel assembly, the assembly comprising
a disk made from metallic materials, the disk arranged around a central axis and having a radially-outermost surface,
a plurality of turbine blades made at least in part from ceramic matrix composite materials, each turbine blade shaped to form an airfoil and a coupler flange that extends circumferentially in both directions around the central axis from a radially-inner end of the airfoil, and
a plurality of keeper collars configured to couple the plurality of turbine blades to the disk for rotation with the disk about the central axis, each of the keeper collars including a retention panel shaped to extend partway about the central axis and formed to define an airfoil-receiver aperture, the airfoil-receiving aperture sized to allow the airfoil of a corresponding one of the turbine blades to move radially outwardly therethrough but also to block the coupler flange of the corresponding one of the turbine blades from radially outwardly movement through the retention panel,
wherein each of the plurality of keeper collars has one airfoil included in the plurality of turbine blades arranged through the airfoil-receiver aperture formed in its retention panel and each of the plurality of keeper collars is coupled directly to the radially-outermost surface of the disk.

* * * * *